T. W. MORGAN.
CENTRIFUGAL CREAM SEPARATOR BOWL.
APPLICATION FILED MAY 11, 1907.
910,011.  Patented Jan. 19, 1909.
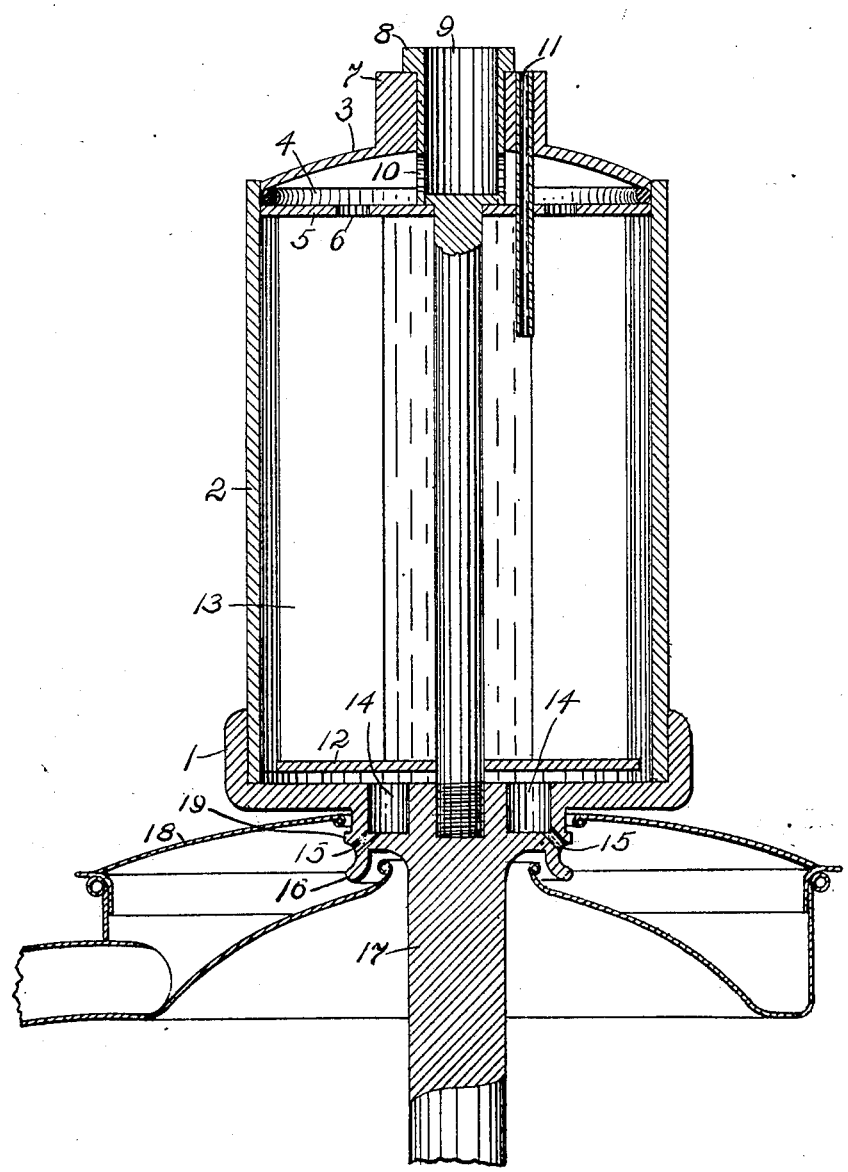
WITNESSES:
INVENTOR
Thomas W. Morgan,
BY
ATTORNEY

UNITED STATES PATENT OFFICE.

THOMAS W. MORGAN, OF WATERLOO, IOWA, ASSIGNOR TO WILBUR W. MARSH, OF WATERLOO, IOWA.

CENTRIFUGAL-CREAM-SEPARATOR BOWL.

No. 910,011.  Specification of Letters Patent.  Patented Jan. 19, 1909.

Application filed May 11, 1907. Serial No. 373,185.

*To all whom it may concern:*

Be it known that I, THOMAS W. MORGAN, a citizen of the United States of America, and a resident of Waterloo, Blackhawk county, Iowa, have invented certain new and useful Improvements in Centrifugal-Cream-Separator Bowls, of which the following is a specification.

My invention relates to improvements in centrifugal cream separator bowls, and the object of my improvement is to provide simple deflecting rings on the base of the bowl above and below its skimmed-milk vents adapted to receive and deliver such milk into a proper concentric receptacle without liability of said milk being carried inwardly or upwardly over the surface of the bowl by reason of capillary attraction. This object I have accomplished by the means which are hereinafter described and claimed, and which are illustrated in the accompanying drawing which represents a central vertical axial section of a centrifugal cream separator bowl having my improved skimmed-milk vents and deflecting-ring thereunder.

I have shown a separator bowl of a well-known type, consisting of a cylindrical receptacle 2 fixed in a base 1, the latter having a downwardly depending spindle 17, skimmed-milk wells 14 leading to vents 15, and a concentric deflecting-ring 16 under said vents. The cover 3 of said bowl has a cylindrical top 7, to which is clamped the clamping-bolt 8, whose lower end screws into the bottom of the bowl, and whose upper end has a milk-inlet 9 in communication with the interior of the bowl through the side openings 10. Inside said bowl 2 is a liner composed of an upper disk 5 having milk-passages 6, a lower disk 12 being supported upon and spaced away from the bottom of the bowl and connected to the upper disk 5 by the plates 13. The cover edges rest upon a ring 4 interposed between them and the upper disk 5. Space is left about the outer edge of the disk 12 to permit the skimmed-milk to pass about it and under it to the wells 14 and vents 15, such disk acting as a baffle-plate. A cream-exit-tube 11 permits exit of separated cream.

18 is a pan adapted to be placed concentrically about the spindle 17 under said bowl, and surrounding the milk-vents 15 so as to receive the skimmed-milk flowing thence. As fast as the skimmed-milk is separated in said bowl it flows about the baffle-plate 12, and gathers in the wells 14, whence it is driven by the centrifugal force of the rotating bowl in outwardly deflected streams through the vents 15 into the pan 18. The deflecting-ring 16 is formed in the shape of a ring concentric with the spindle 17, and spaced away therefrom, immediately below the vents 15. In contour the said ring 16 has an outwardly directed curve, this form causing it to serve the purpose of a water-table molding in deflecting the streams issuing from such vents away from the axis of the bowl. On account of the overhanging of such ring, the skimmed-milk is prevented from drawing back inwardly over the lower surface of the base of the bowl toward the spindle to foul the driving mechanism, but is thus under the influence of centrifugal force caused to be delivered to the receptacle below without loss.

The annulet 19 is located immediately above the vents 15, and prevents the issuing skimmed-milk from ascending above it, by deflecting and discharging such milk into the pan 18. It does this by virtue of the fact that a fluid moving outward under the influence of centrifugal force tends to follow a surface to the extreme outer edge thereof and then creep upward over the vertical surface of the bowl, unless some molding such as a fillet or other projecting obstacle is interposed, and in the latter case the fluid is thrown off at the angular edge of such annulet, and would be received in the pan below.

Having described my invention, what I claim as new, and desire to secure by Letters Patent, is—

1. In a centrifugal cream separator, a bowl having skim-milk exits at the base thereof, an annular deflecting ring located below said exits, and an annular deflecting ring located above said exits, and a pan having an opening formed through the bottom thereof, the edges of said opening lying above the lower edge of the lower deflecting ring and said pan having a cover, said cover having an opening therethrough, the edges of said last named opening lying above the upper deflecting ring.

2. In a centrifugal cream separator, the combination with a bowl having skim-milk exits at the base thereof, of a downwardly and outwardly directed annular deflecting ring located immediately below said exits, an annular deflecting ring located above said exits, a pan having an opening through the bottom thereof, the edges of said opening lying within and above the edges of the lower deflecting ring, and a cover for said pan, said cover having an opening therethrough, the edges of said last named opening lying above the upper deflecting ring.

Signed at Waterloo, Iowa, this 23rd day of April, 1907.

THOMAS W. MORGAN.

Witnesses:
O. D. YOUNG,
G. C. KENNEDY.